Oct. 28, 1958    H. J. GLUECKSTEIN ET AL    2,857,782
INDEX MECHANISM WITH INTERMEDIATE STOP
Filed Nov. 12, 1953    3 Sheets-Sheet 1

INVENTOR.
HENRY J. GLUECKSTEIN
BY ROBERT V. ANDERSON

John W. Michael
ATTORNEY

Oct. 28, 1958  H. J. GLUECKSTEIN ET AL  2,857,782
INDEX MECHANISM WITH INTERMEDIATE STOP
Filed Nov. 12, 1953  3 Sheets-Sheet 2

INVENTORS
HENRY J. GLUECKSTEIN
ROBERT V. ANDERSON
BY
John W. Michael
ATTORNEY

INVENTOR.
HENRY J. GLUECKSTEIN
ROBERT V. ANDERSON
BY John W. Michael
ATTORNEY

United States Patent Office 2,857,782
Patented Oct. 28, 1958

2,857,782

INDEX MECHANISM WITH INTERMEDIATE STOP

Henry J. Glueckstein, Waukesha, and Robert V. Anderson, Thiensville, Wis., assignors to Globe-Union Inc., Milwaukee, Wis., a corporation of Delaware Application November 12, 1953, Serial No. 391,442

6 Claims. (Cl. 74—527)

This invention relates to improvements in indexes for rotatable selector switches and the like and particularly to such indexes having intermediate stops.

In many uses it is desirable to prevent the accidental rotation of the switching mechanism into a position which may deleteriously affect circuits, components or equipment.

It is an object of this invention therefore to provide an intermediate locking index which in normal usage cannot be rotated beyond preselected position without unusual attention from the operator.

A further object is to provide such an index which is relatively simple and inexpensive to manufacture.

These objects are obtained by using parts now available for non-intermediate locking indexes and combining such parts with a two-section operating shaft so that relative axial movement of such sections is required to rotate the shaft beyond any preselection intermediate lock. The notching of the periphery of a standard indexing rotor is arranged so as to have at least one intermediate finger between the usual extreme stops. Such rotor is mounted on a first shaft having axial movement from a normal to a release position. In said normal position such finger will engage a fixed lug on a stator and in said release position such finger will clear such lug. A standard index assembly is mounted on a coaxial shaft with respect to which the first shaft has limited axial movement and positive rotational drive. As the first shaft is rotated the indexing will take place as normal. However, when the intermediate finger strikes such fixed lug, further rotation will be stopped. To advance the shaft to the next indexed position the first shaft is moved axially with respect to the coaxial shaft until the intermediate finger clears the fixed lug. The extreme limit stopping is best accomplished by the standard index assembly on the inner shaft.

The invention will best be understood from the following description when read in connection with the accompanying drawings, in which.

Figure 1:
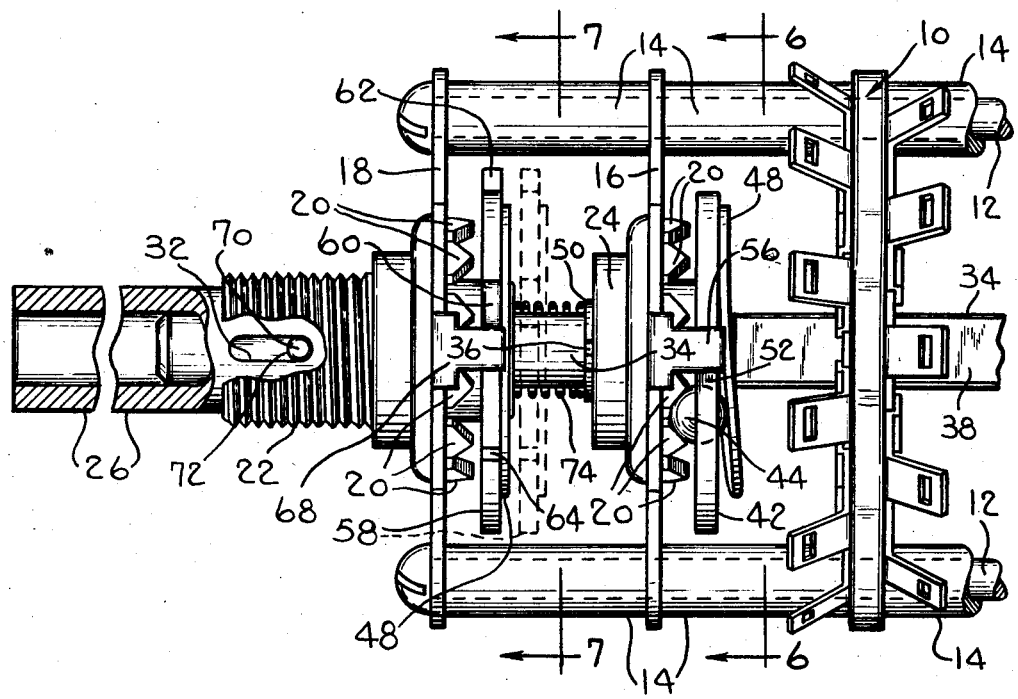
Fig. 1 is a view in side elevation of an intermediate stop index mechanism embodying the present invention.
Figure 2:
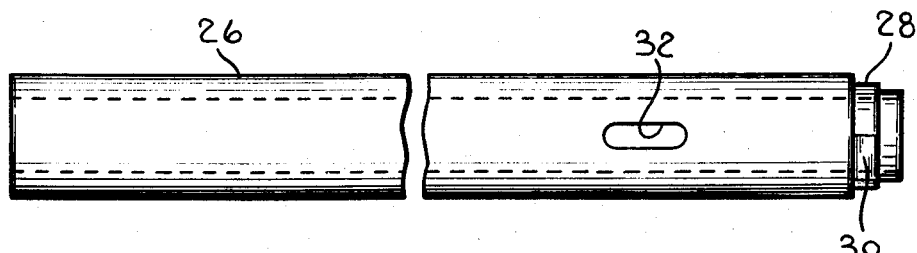
Fig. 2 is a fragmentary view in side elevation of the sleeve constituting an element of such mechanism.
Figure 3:
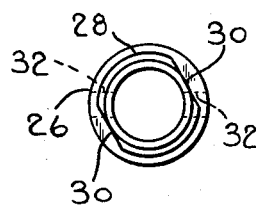
Fig. 3 is a right end view of the sleeve of Fig. 2.
Figure 4:
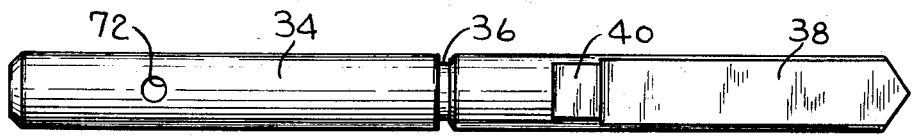
Fig. 4 is a view in side elevation of the inner shaft of such mechanism.
Figure 5:
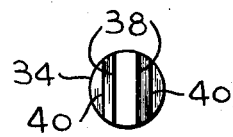
Fig. 5 is a right hand end view of the shaft of Fig. 4.

Referring to the drawings, the index mechanism of this invention is shown incorporated in a miniature rotary switch which is a well known component in the radio and television field. Such switch has one or more steatite switch sections 10 of customary design mounted by tie rods 12 and spacers 14 to each other and to the stator 16 of the indexing mechanism and the mounting plate 18. The mounting plate 18 may be the same as the stator 16 with the exceptions hereinafter noted. Each has a circular ratchet 20 the teeth of which are spaced angularly at 30°. The mounting plate 18 has a threaded bushing 22 by which the unit may be secured to a panel. The stator 16 has a plain bushing 24.

A two-part shaft is rotatably carried in the bushings 22 and 24. The outer shaft 26 is a sleeve which slidably fits on the inner shaft and carries the operating knob on its outer end (left as viewed). The inner end of the outer shaft has a shoulder 28 with opposed flats 30 on which is mounted and staked an intermediate stop rotor. Such shaft has a pair of oppositely related elongated slots 32 which receive a pin on the inner shaft to provide positive rotational drive and permit limited axial movement between such outer shaft and the inner shaft. The inner shaft has a cylindrical portion 34 which slidably fits in the bore of the outer shaft 26. Such cylindrical portion has a C-ring holding groove 36. The inner shaft has a flattened area 38 projecting beyond both the stator 16 and an index rotor and slidably fitting into flat openings in the rotors of the switch sections 10. At the juncture between the flattened portion 38 and the cylindrical portion 34 there are a pair of opposed flats 40 to which are staked a rotor of an indexing assembly.

The indexing assembly is well known to those skilled in this art and is described in U. S. Patent No. 2,130,219. In addition to the stator plate 16 the indexing assembly includes a rotor 42 (see Fig. 6) which is staked to the flats 40 of the inner shaft. A ball 44 mounted in an opening in the rotor is urged against the ratchet 20 by an index spring 48 having a central portion secured to the rotor 42 by the same staking which secures such rotor to the inner shaft. A C-ring 50 bears against the plain bushing 24 and holds such shaft from moving axially under the bias of the spring 48. The outer periphery of the index rotor 42 is notched as shown to provide two stops 52 and 54 which cooperate with a lug 56 projecting from the index stator 16 to limit the extreme of rotation of both shafts.

To provide intermediate stops for the indexing mechanism a rotor 58 (see Fig. 7), staked to the flats 30 of the outer shaft, has on its periphery two fingers 60 and 62 spaced angularly 90°. The stops 60 and 62 normally rotate in a path which is in overlapping relationship with a lug 68 formed on the mounting plate 18 and such lug and fingers engage on a surface the plane of which is substantially parallel to the axis of rotation of the rotor 58 to positively stop rotation. The outer shaft is rotatably mounted in the bushing 22 and has limited axial movement relative to the inner shaft 38. The limits of this movement are determined by a pin 70 carried in an opening 72 and slidable in the slot 32. A coil spring 74 mounted on the inner shaft reacts against the plain bushing 24 and the rotor 58 to normally urge such rotor to the left into its normal position. When the outer shaft is pressed inwardly the slot 32 will move (to the right as viewed) relative to the pin 70 to permit the fingers 60 and 62 to clear the lug 68. However, the rotational movement of the outer shaft 26 is always fixedly transmitted to the inner shaft 38 through such pin and slot arrangement. The angular spacing between fingers 60 and 62 can be varied to meet special requirements, so long as such angular spacing is a multiple of 30°. Shoulders 64 and 66 are preferably spaced so that they will not function as limit stops. Instead, the limits of rotation will be determined by the stops 52 and 54 on the indexing rotor 42, This eliminates the necessity of accurate alinement of the two rotors.

Figure 6:
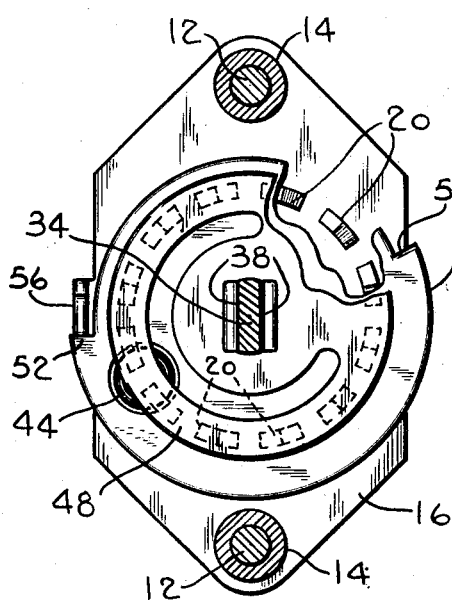
Fig. 6 is a sectional view taken on the line 6—6 of Fig. 1.
Figure 7:
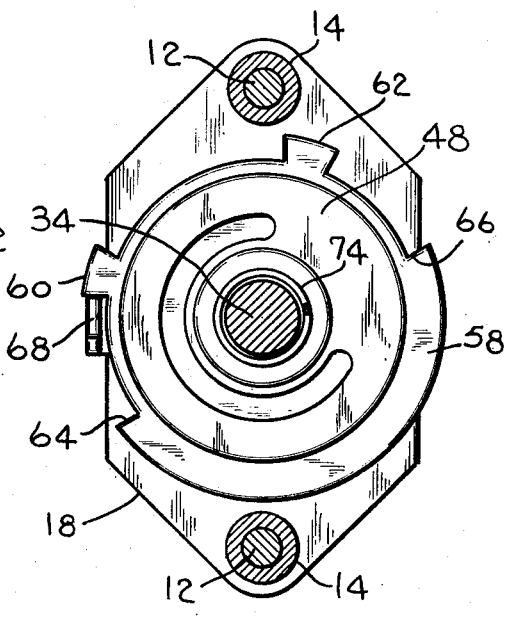
Fig. 7 is a sectional view taken on the line 7—7 of Fig. 1.

Starting with the parts positioned as shown in the figures, to effect rotation counterclockwise as viewed in Figs. 6 and 7, it is first necessary to push the shaft 26 axially to the right against the tension in the spring 74 to bring the finger 60 out of alinement with the lug 68. This temporary position of the rotor 58 is shown in the broken line of Fig. 1. When in this position counterclockwise rotation of the shafts may be commenced. As soon as the finger 60 clears the lug 68, the spring 74 will return the rotor 58 to its normal path. Indexed rotation will then continue until the finger 62 engages the lug 68. This will stop further rotation until the shaft 26 has again been shifted axially to the right to release such engagement. The location of the fingers 60 and 62 and the number of such fingers depends entirely upon the use for which the indexing mechanism is to be put. It is only necessary to determine which one or ones of the indexed positions should not be entered into during normal rotation of the mechanism. Fingers are placed so as to stop such normal rotation before such particular indexed position is entered into and thus prevent accidental selection thereof.

Figure 8:
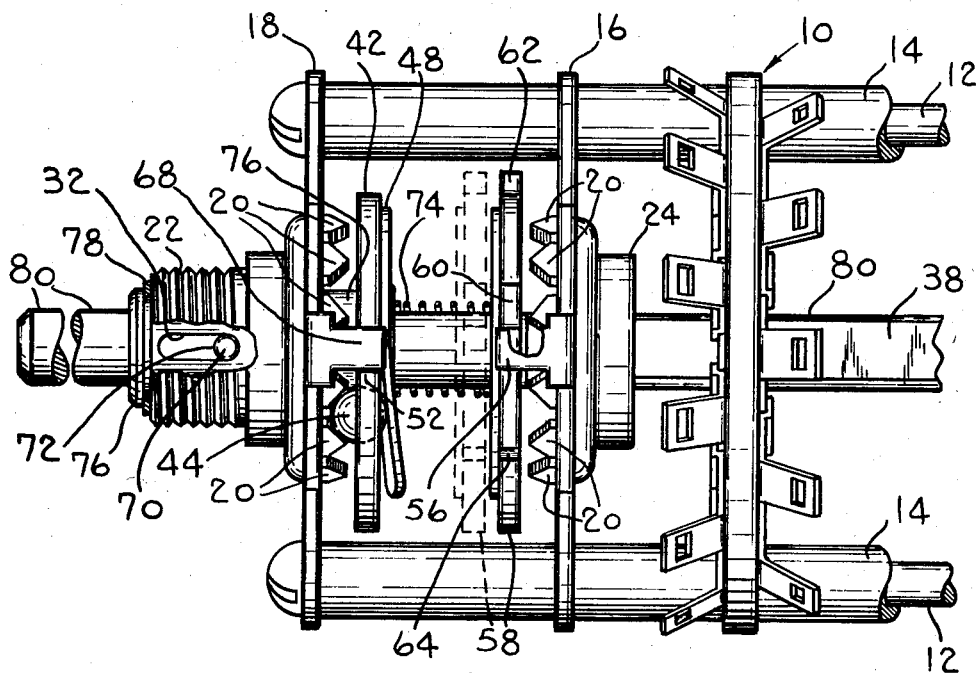
Fig. 8 is a view in side elevation of a modification of such intermediate stop index mechanism.
Figure 9:
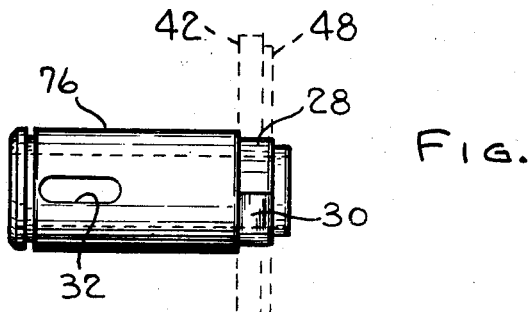
Fig. 9 is a fragmentary view in side elevation of the sleeve of such modification.
Figure 10:
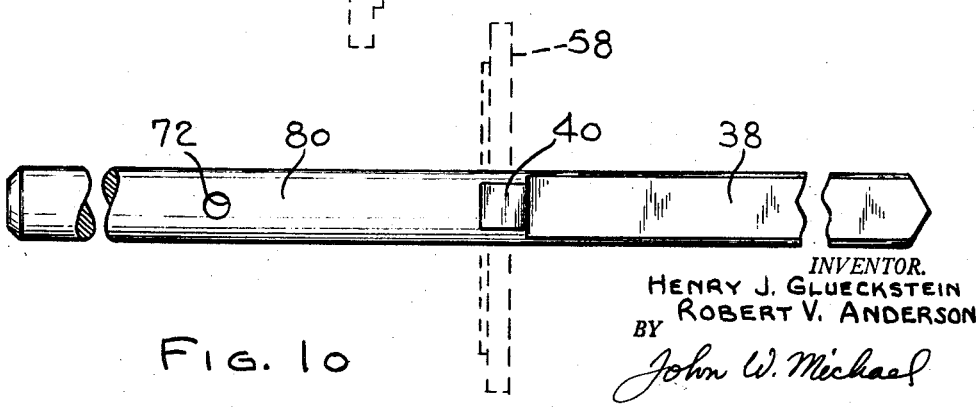
Fig. 10 is a fragmentary view in side elevation of the shaft of such modification.

In the modification shown in Figs. 8 to 10 inclusive, the intermediate stop is released by pulling on the control. In some respects this is more positive because an operator might unconsciously apply a pushing pressure, whereas pulling requires a conscious effort. In this modification the mounting plate 18 is an element of the standard indexing mechanism and the rotor 42 with its spring 48 is staked to a sleeve 76 which is rotatably mounted in the bushing 22 and held against axial displacement by a C-ring 78. The standard index operates as previously described, with the stops 52 and 54 cooperating with the lug 68 instead of the lug 56.

The stator 16 of the intermediate stop mechanism is reversed so that the ratchet 20 faces the mounting plate 18. The rotor 62, instead of being mounted on the sleeve, is staked to a shaft 80 which is slidably carried within the sleeve 76 for rotation therewith. The shaft 80 extends beyond the end of the sleeve 76 and a control knob is secured thereto. Except for differences in length and the groove for the C-ring the sleeve 76 and shaft 80 are like their respective counterparts sleeve 26 and shaft 34. The same pin 72 and slot 32 arrangement determines the limited relative axial movement while providing positive angular drive. The spring 74 on the shaft 80 now exerts pressure from the non-axially movable rotor 42 to the axially movable rotor 58. In order to permit the fingers 60 and 62 to clear the lug 56 the shaft 80 is pulled out compressing the spring 74.

This application is intended to cover such changes or modifications as come within the spirit of the invention or scope of the following claims.

We claim:

1. An index mechanism having a two-part control shaft only one of which is adapted to mount a control knob, the other of which carries an indexing rotor and is held against axial displacement, said one shaft being relatively movable axially of the other shaft, a rotor and a control knob carried by said one shaft, said rotor having a finger on the periphery thereof extending radially of the axis of rotation of said rotor, and a lug fixedly mounted and extending axially of said rotor into the path of said finger when said rotor is in its normal position to positively stop angular movement of said rotor between its extremes of angular travel, said rotor being movable axially with said shaft to move the path of said finger out of overlapping relationship with said lug.

2. In an indexing mechanism with an intermediate stop, a two-part operating shaft having parts axially relatively movable and rotationally relatively fixed, indexing mechanism on one of said parts, said one of said parts being restrained from axial displacement, a finger on the other of said parts movable in a normal path upon rotation of said shaft, a fixed lug in said normal path to engage and stop rotation of said shaft, said finger being movable out of said path and out of engagement with said lug upon axial movement of said other of said parts, a control knob on only said other of said parts, and resilient means biasing said finger into said normal path.

3. An indexing mechanism with intermediate stop comprising a stator, an inner shaft rotatably mounted in said stator and restrained against axial displacement, an indexing rotor on said inner shaft, ratchet teeth on said stator, a ball and spring on said rotor, said ball cooperating with said teeth to form an index, a lug on said stator, spaced stops on the periphery of said rotor engageable with said lug to provide extreme limits of rotation, a sleeve slidable on said inner shaft, a control knob on only said sleeve, an elongated slot in said sleeve, a pin on said inner shaft slidable in said slot to provide a rotational drive between said sleeve and shaft while permitting limited relative axial movement therebetween, an intermediate stop rotor on said sleeve having a finger on the periphery thereof, a fixed lug in the normal path of said finger, and resilient means for keeping said intermediate stop rotor in said normal path except when said sleeve is moved relative to said inner shaft to depress said resilient means.

4. An intermediate stop for an indexing mechanism having an operating shaft restrained against axial displacement, comprising, a sleeve mounted on said shaft, a control knob on only said sleeve, means for transmitting rotational force between said sleeve and shaft while allowing limited axial movement therebetween, a lug fixedly carried by said indexing mechanism and extending substantially parallel to the axis of rotation of said shaft and sleeve, resilient means for urging said sleeve to one extreme of its axial movement, and a finger operated by said sleeve and extending radially of the axis of rotation of said shaft and sleeve into overlapping relationship with said lug when said sleeve is in said one extreme, said finger being out of such overlapping relationship when said sleeve is in the other extreme of its axial movement.

5. An indexing mechanism with intermediate stop comprising a stator, a sleeve rotatably mounted in said stator and restrained against axial displacement, an indexing rotor on said sleeve, ratchet teeth on said stator, a ball and spring on said rotor, said ball cooperating with said teeth to form an index, a lug on said stator, spaced stops on the periphery of said rotor engageable with said lug to provide extreme limits of rotation, an inner shaft slidable in said sleeve, a control knob on only said shaft, an elongated slot in said sleeve, a pin on said inner shaft slidable in said slot to provide a rotational drive between said sleeve and shaft while permitting limited relative axial movement therebetween, a rotor on said inner shaft having a finger on the periphery thereof, a fixed lug in the normal path of said finger, and resilient means for keeping said latter rotor in said normal path except when said inner shaft is moved relative to said sleeve to depress said resilient means.

6. An intermediate stop for an indexing mechanism having an operating shaft comprising, a sleeve mounted on said shaft and restrained against axial displacement, a control knob on only said shaft, means for transmitting rotational force between said sleeve and shaft while allowing limited axial movement therebetween, a lug fixedly carried by said indexing mechanism and extending substantially parallel to the axis of rotation of said shaft and sleeve, resilient means for urging said operating shaft to one extreme of its axial movement, and a finger operated by said operating shaft and extending radially of the axis of rotation of said shaft and sleeve into overlapping relationship with said lug when said operating shaft is in said one extreme, said finger being out of such overlapping relationship when said operating shaft is in the other extreme of its axial movement.

References Cited in the file of this patent

UNITED STATES PATENTS

| | | |
|---|---|---|
| 2,115,245 | Allison | Apr. 26, 1938 |
| 2,115,284 | Pratt | Apr. 26, 1938 |
| 2,130,219 | Allison et al. | Sept. 13, 1938 |
| 2,341,647 | Parkhurst | Feb. 15, 1944 |
| 2,548,994 | Miller et al. | Apr. 17, 1951 |
| 2,639,338 | Kwasniewski | May 19, 1953 |
| 2,642,502 | Johnson | June 16, 1953 |
| 2,668,200 | Glaze | Feb. 2, 1954 |